US008424899B1

(12) United States Patent
Larson et al.

(10) Patent No.: US 8,424,899 B1
(45) Date of Patent: Apr. 23, 2013

(54) WHEELED ATTACHMENT FOR A LITTER

(76) Inventors: Donald O. Larson, Audubon, MN (US); Kasey P. Larson, Detroit Lakes, MN (US)

( * ) Notice: Subject to any disclaimer, the term of this patent is extended or adjusted under 35 U.S.C. 154(b) by 407 days.

(21) Appl. No.: 12/828,898

(22) Filed: Jul. 1, 2010

(51) Int. Cl.
*B62B 1/12* (2006.01)

(52) U.S. Cl.
USPC .......................................... 280/640; 280/652

(58) Field of Classification Search .................. 280/767, 280/43.15, 43.16, 47.26, 640, 659, 38, 40, 280/64
See application file for complete search history.

(56) References Cited

U.S. PATENT DOCUMENTS

| | | | | |
|---|---|---|---|---|
| 719,059 | A | 1/1903 | Tabor | |
| 2,657,069 | A | 10/1953 | Quist | |
| 4,448,434 | A * | 5/1984 | Anderson | 280/40 |
| 4,576,389 | A * | 3/1986 | Villaveces et al. | 280/43.16 |
| 4,624,467 | A * | 11/1986 | Burns | 280/40 |
| 4,754,985 | A * | 7/1988 | Im et al. | 280/40 |
| 4,761,012 | A * | 8/1988 | Dames | 280/38 |
| 4,917,392 | A * | 4/1990 | Ambasz | 280/40 |
| 5,072,958 | A * | 12/1991 | Young | 280/40 |
| 5,330,212 | A * | 7/1994 | Gardner | 280/40 |
| 5,586,775 | A * | 12/1996 | Cheng | 280/38 |
| 5,630,601 | A * | 5/1997 | vom Braucke et al. | 280/40 |
| 5,879,022 | A * | 3/1999 | Winton | 280/655 |
| 5,887,879 | A * | 3/1999 | Chumley | 280/40 |
| 5,984,327 | A * | 11/1999 | Hsieh et al. | 280/47.24 |
| 6,053,514 | A * | 4/2000 | Su | 280/40 |
| 6,142,491 | A | 11/2000 | Darling | |
| 6,164,671 | A | 12/2000 | Darling | |
| 6,217,043 | B1 * | 4/2001 | Chumley | 280/40 |
| 6,270,092 | B2 | 8/2001 | Darling | |
| 6,283,496 | B1 | 9/2001 | Dickmann | |
| 6,561,529 | B2 | 5/2003 | Darling | |
| RE38,436 | E * | 2/2004 | Su | 280/40 |
| 6,698,811 | B1 | 3/2004 | Schuchman | |
| 6,811,179 | B2 | 11/2004 | Woods | |
| 6,811,180 | B1 | 11/2004 | Molliere | |
| 6,824,152 | B1 * | 11/2004 | Scott | 280/79.7 |
| 7,017,939 | B2 | 3/2006 | Darling | |
| 7,097,183 | B1 * | 8/2006 | Su | 280/47.29 |
| 7,118,115 | B2 * | 10/2006 | Abel | 280/43.13 |
| 7,150,465 | B2 | 12/2006 | Darling | |
| 7,387,306 | B2 * | 6/2008 | Zimmer | 280/47.29 |
| 7,407,171 | B2 * | 8/2008 | Roberson | 280/47.18 |

(Continued)

OTHER PUBLICATIONS http://www.charlieshorse.com/html/comm/com_prod.html; Charlie's Horse; Riverhead, NY; 2007.

*Primary Examiner* — Jeffrey J Restifo
(74) *Attorney, Agent, or Firm* — Neustel Law Offices

(57) ABSTRACT

A wheeled attachment for a litter for transportation of a litter via a single operator. The wheeled attachment generally includes a traverse frame extending across one end of the litter, first and second receiver tubes pivotally connected to opposing ends of the frame, the first and second receiver tubes pivoting between a first position against the frame and a second position perpendicular with the frame to receive the handle ends of the litter, and including first and second wheels pivotally connected to opposing ends of the frame and coupled to the receiver tubes to also pivot between the first and second pivotal positions parallel to and perpendicular with the frame. The receiver tubes also include an opening and coupler assembly for fixing the handles within the respective coupler. The frame further preferably extends above the netting of the litter to provide a foot stop for the patient upon the litter.

18 Claims, 9 Drawing Sheets

U.S. PATENT DOCUMENTS

| | | | | |
|---|---|---|---|---|
| 7,413,199 | B2 * | 8/2008 | McCalley | 280/63 |
| 7,780,175 | B2 * | 8/2010 | McCalley | 280/63 |
| 8,162,348 | B2 * | 4/2012 | Thomas | 280/646 |
| 2007/0216118 | A1 | 9/2007 | Jackson | |
| 2010/0044983 | A1 * | 2/2010 | Panigot | 280/40 |
| 2010/0237111 | A1 * | 9/2010 | Mroczka | 224/156 |

* cited by examiner

WHEELED ATTACHMENT FOR A LITTER

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a litter vehicle and more specifically it relates to a wheeled attachment for a litter for efficiently securing an attachment to a litter to allow one individual to easily transport a patient or supplies atop of the litter.

2. Description of the Related Art

Any discussion of the related art throughout the specification should in no way be considered as an admission that such related art is widely known or forms part of common general knowledge in the field.

Litter type vehicles have been in use for years and are commonly utilized to transport patients and/or supplies by having a carrying individual at each end of the litter to hold the respective end. It may sometimes be difficult to have enough staff nearby to utilize the litter thus making patients and/or supplies wait to be transported. It can also be unnecessarily costly and time consuming to constantly employ extra staff to ensure two persons are present to carry one litter.

Devices have been available in the past to help ease the burden of carrying a litter. However, these devices are often bulky and heavy thus being difficult to carry and haul from location to location. Because of the inherent problems with the related art, there is a need for a new and improved wheeled attachment for a litter for efficiently securing an attachment to a litter to allow one individual to easily transport a patient or supplies atop of the litter.

BRIEF SUMMARY OF THE INVENTION

A system for efficiently securing an attachment to a litter to allow one individual to easily transport a patient or supplies atop of the litter. The invention generally relates to a litter vehicle which includes a traverse frame extending across one end of the litter, first and second receiver tubes pivotally connected to opposing ends of the frame, the first and second receiver tubes pivoting between a first position against the frame and a second position perpendicular with the frame to receive the handle ends of the litter, and including first and second wheels pivotally connected to opposing ends of the frame and coupled to the receiver tubes to also pivot between the first and second pivotal positions parallel to and perpendicular with the frame. The receiver tubes also include an opening and coupler assembly for fixing the handles within the respective coupler. The frame further preferably extends above the netting of the litter to provide a foot stop for the patient upon the litter.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
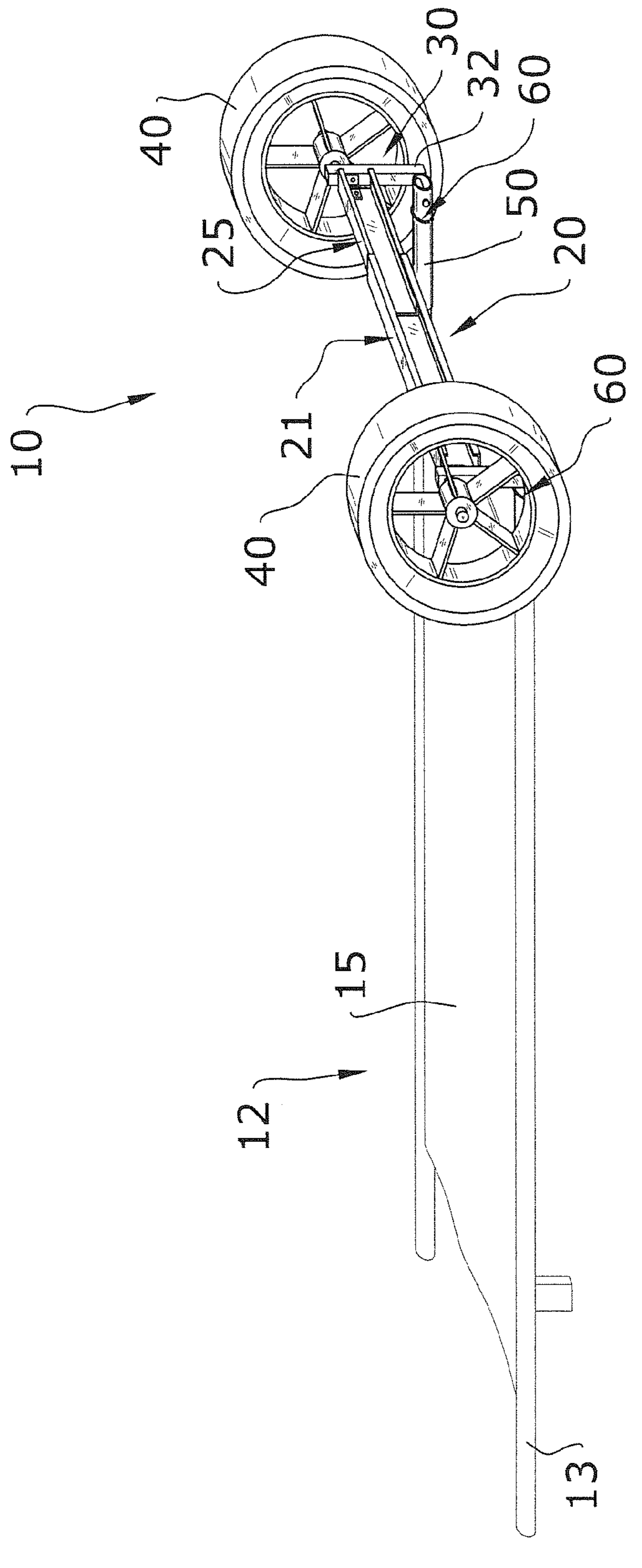
FIG. 1 is an upper perspective view of the present invention attached to a litter.
Figure 2:
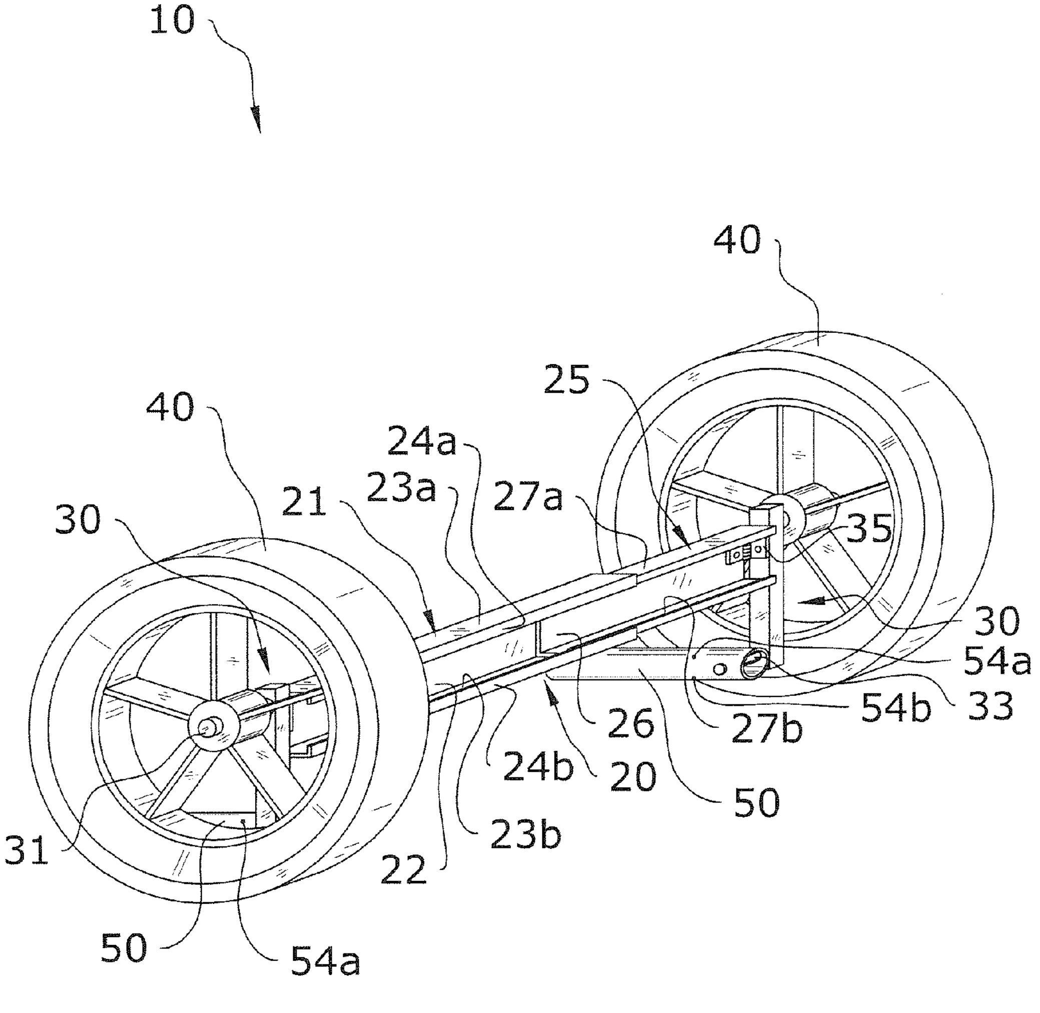
FIG. 2 is an upper perspective view of the present invention in the folded out (in-use) position.
Figure 3:
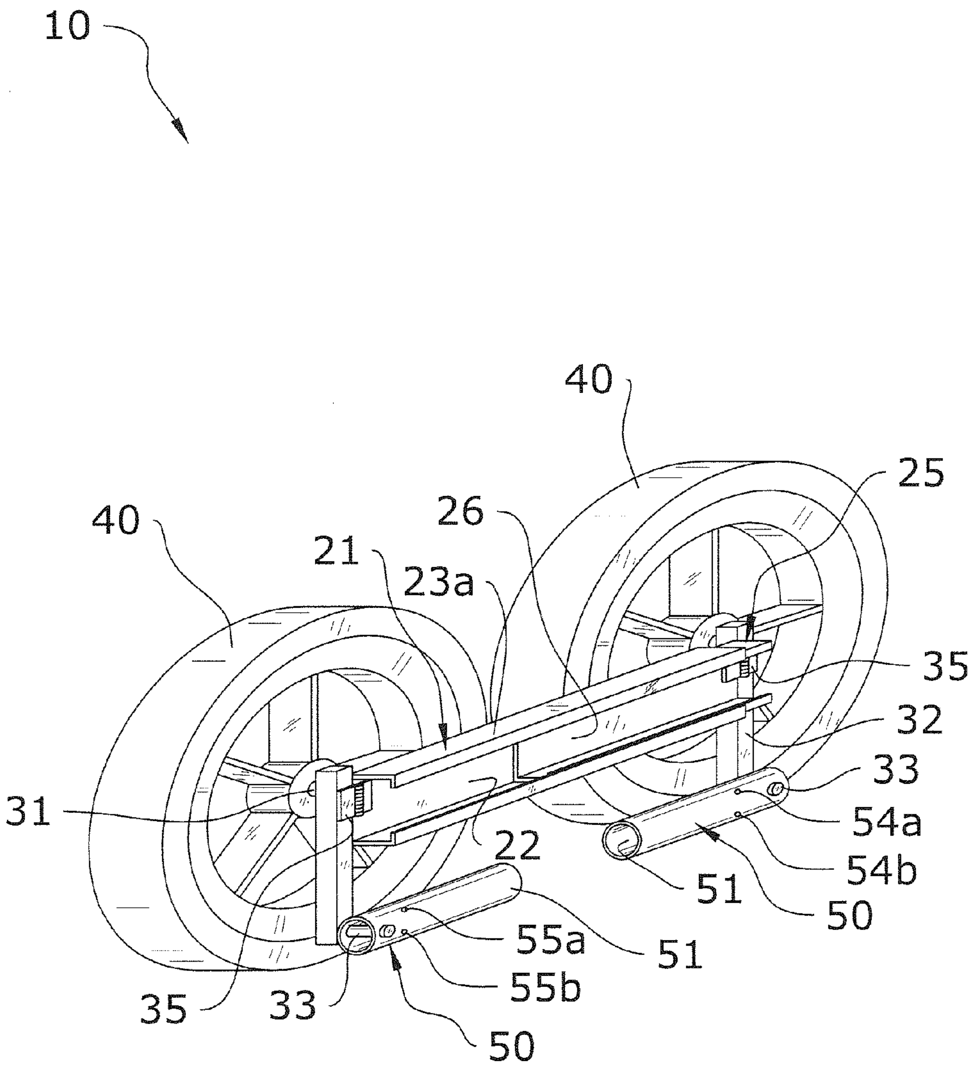
FIG. 3 is an upper perspective view of the present invention in the folded in (non-use) position.
Figure 4:
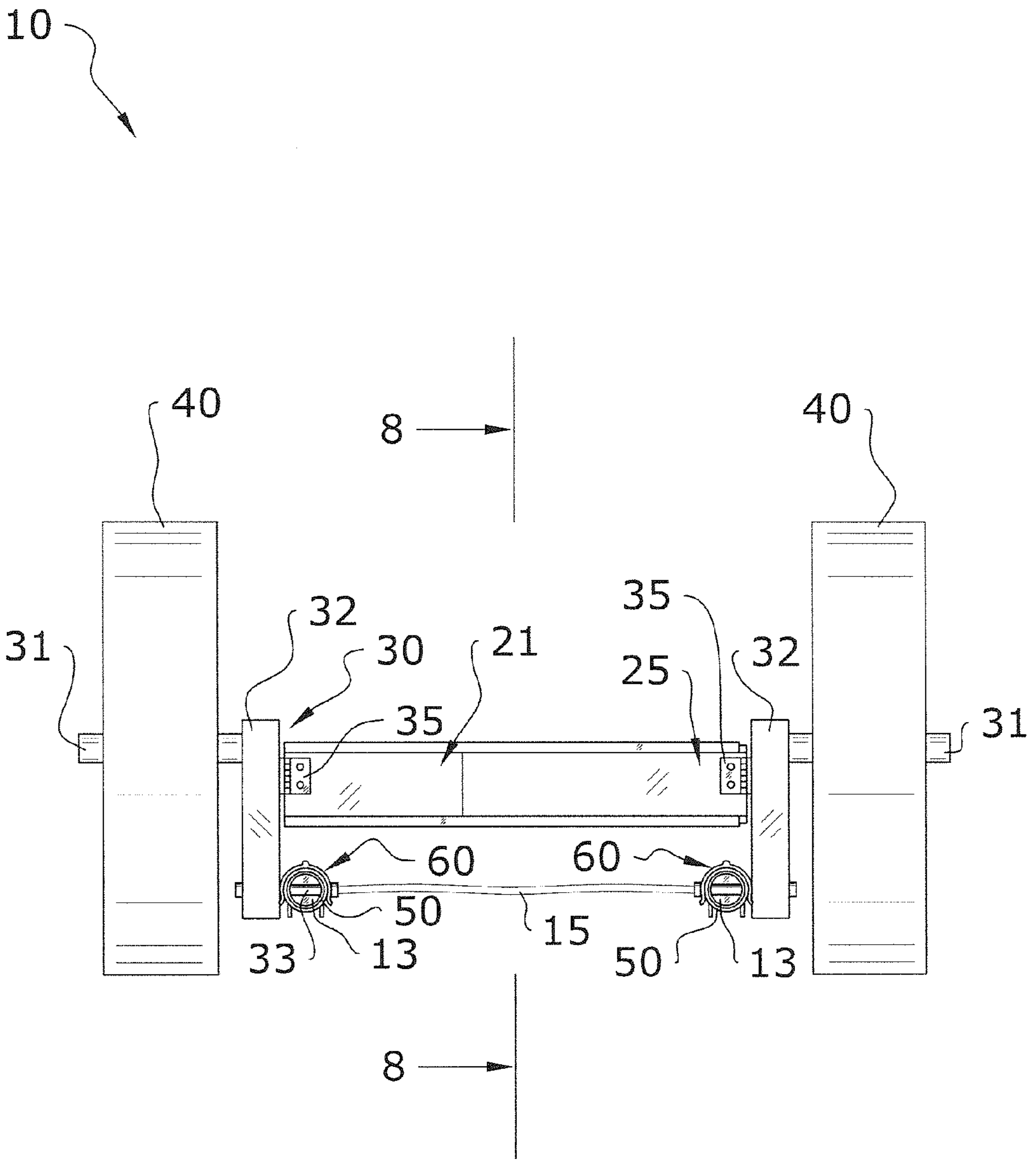
FIG. 4 is a front view of the present invention.
Figure 5:
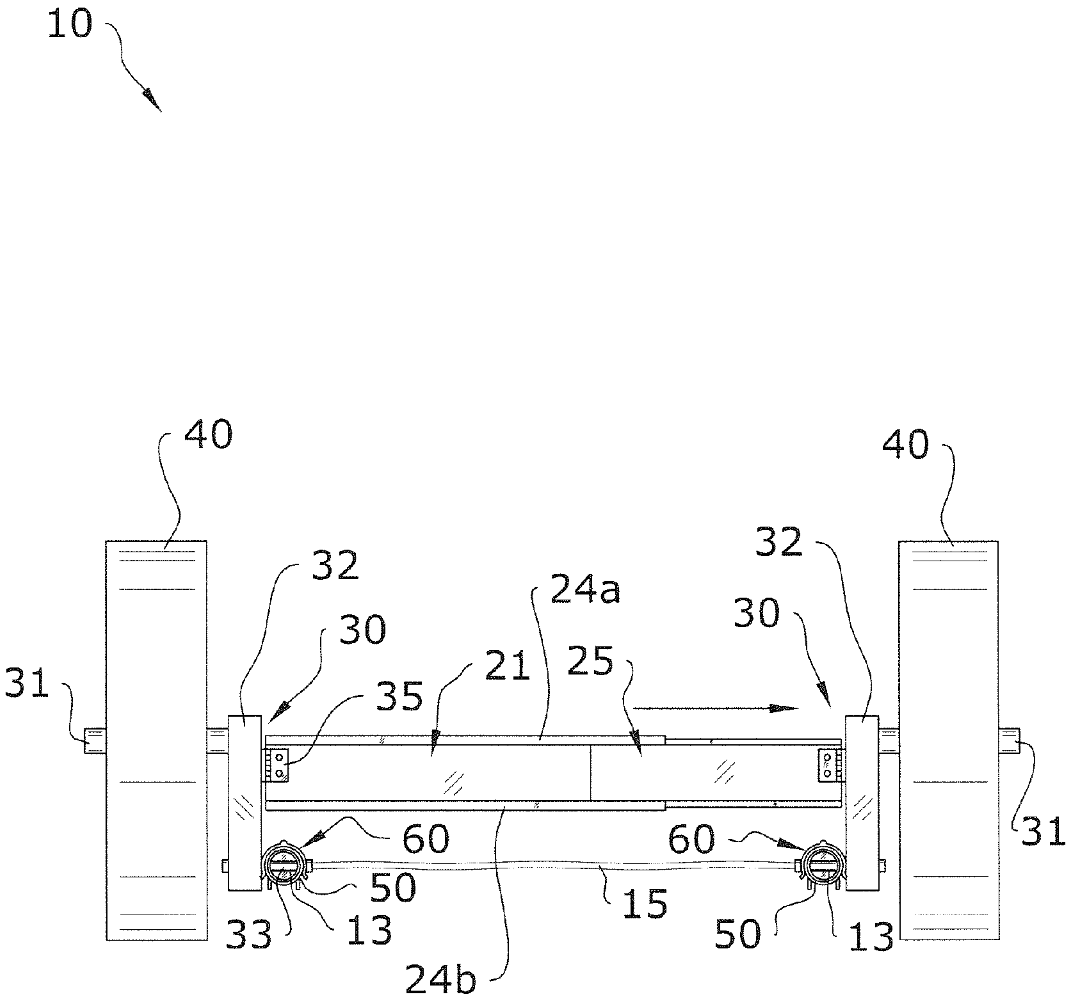
FIG. 5 is a front view of the present invention with the length of the traverse frame adjusted.
Figure 6:
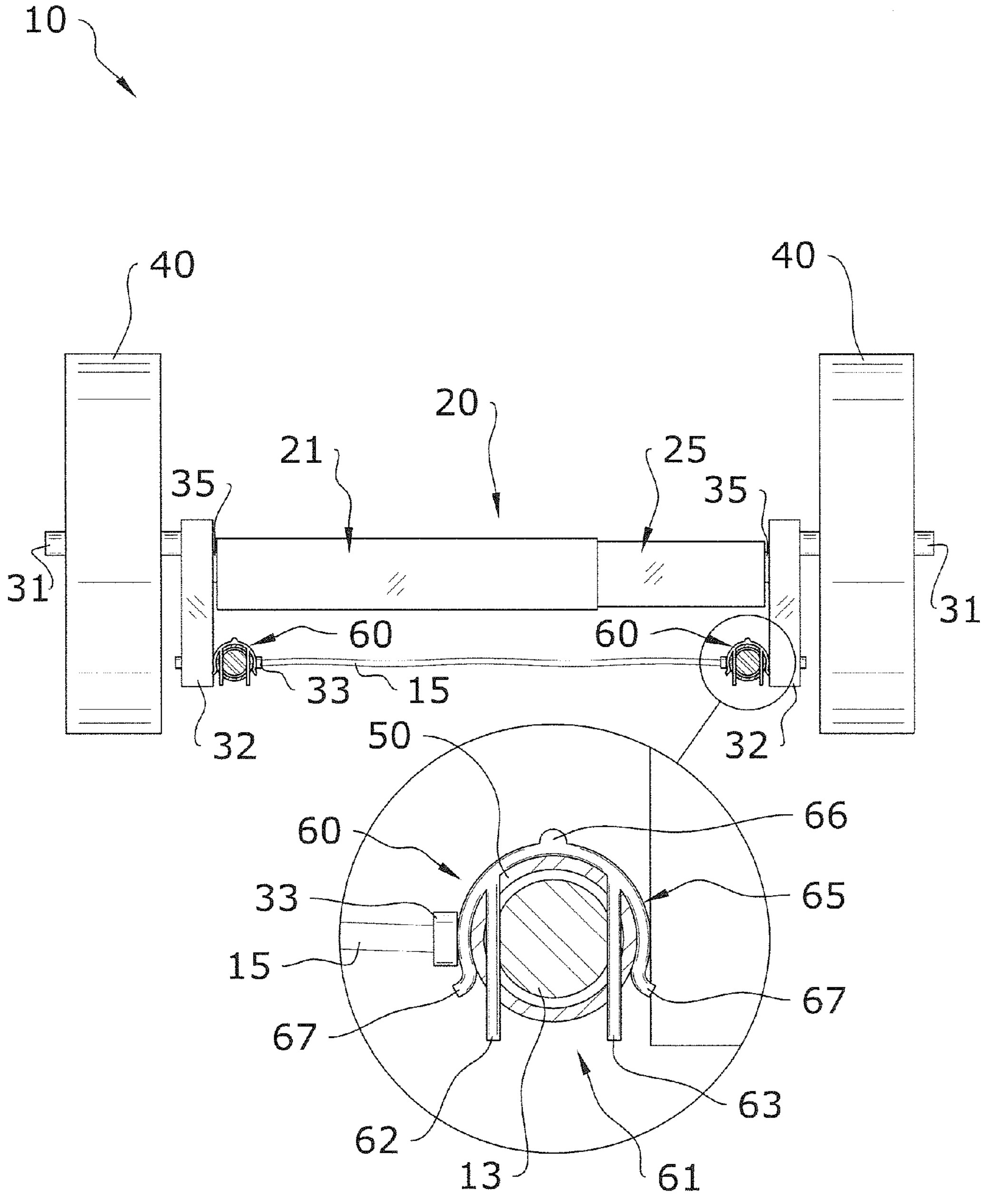
FIG. 6 is a front view of the present invention with the receiver member and coupler magnified.
Figure 7:
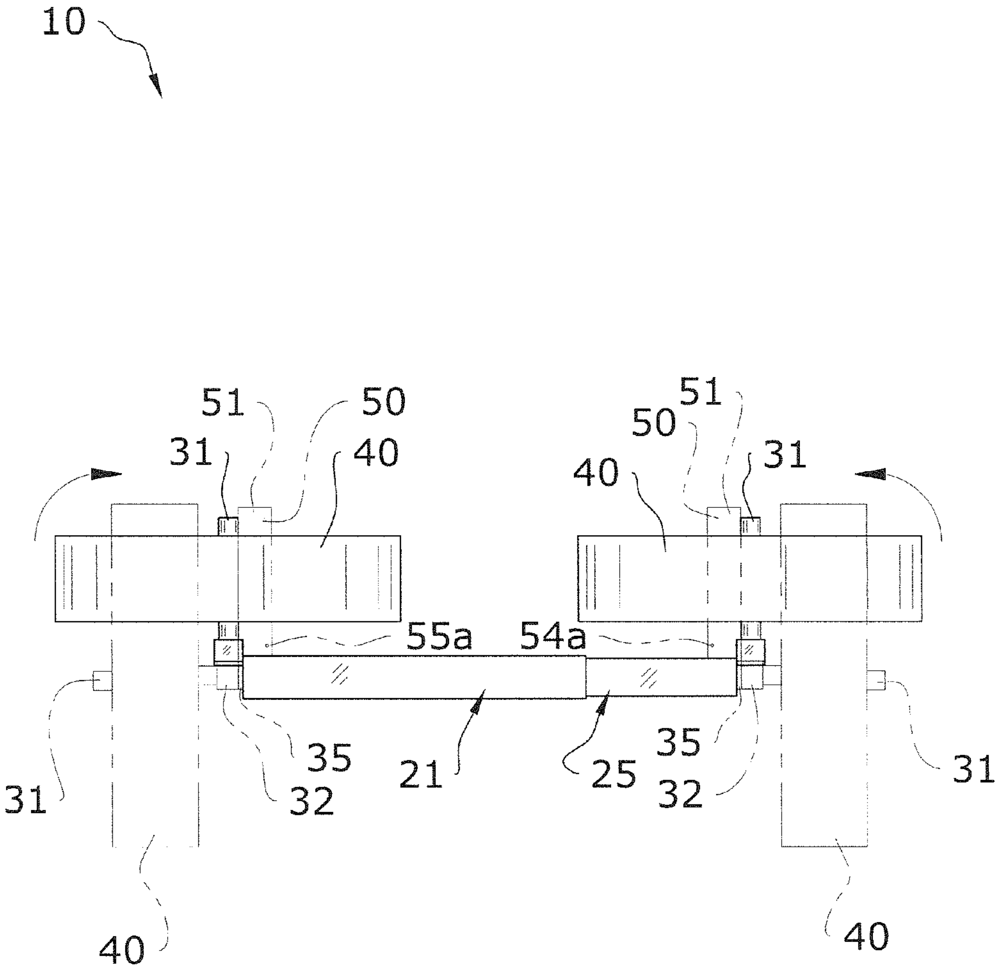
FIG. 7 is a top view of the present invention with the wheels and receiver tubes being folded inwards.
Figure 8:
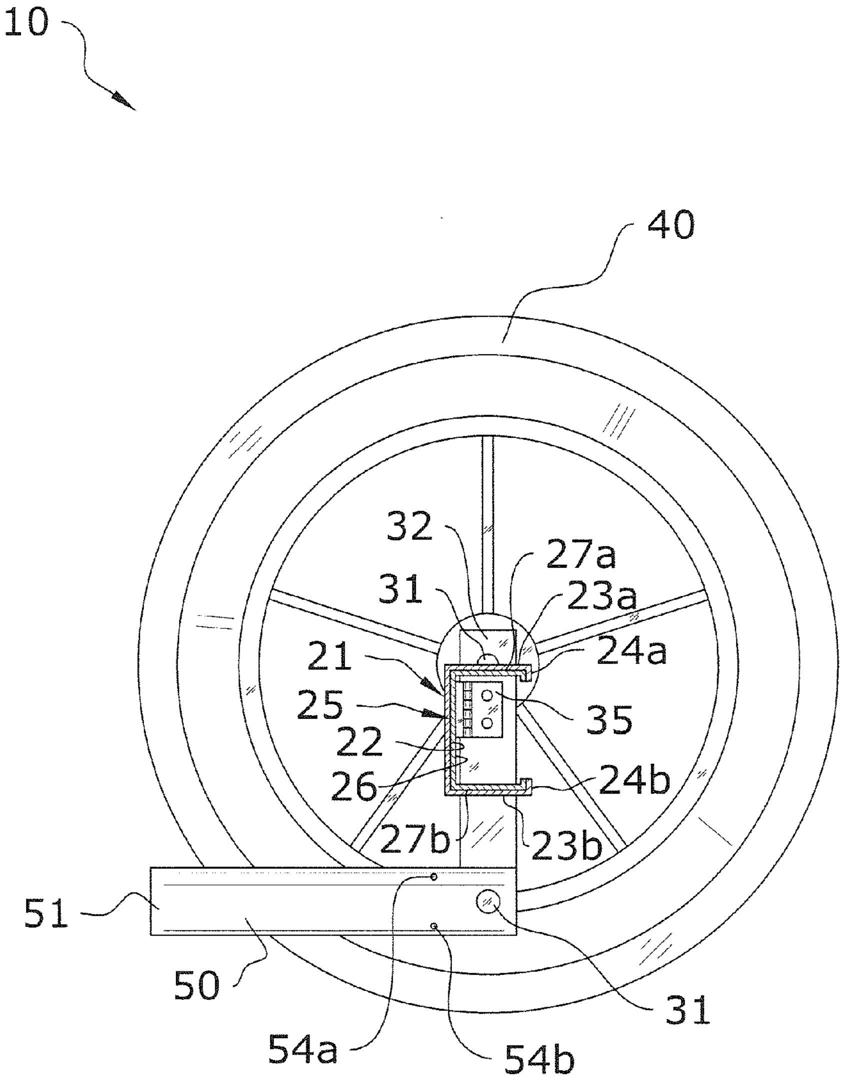
FIG. 8 is a sectional view taken along lines 8-8 of FIG. 4 with the litter removed.
Figure 9:
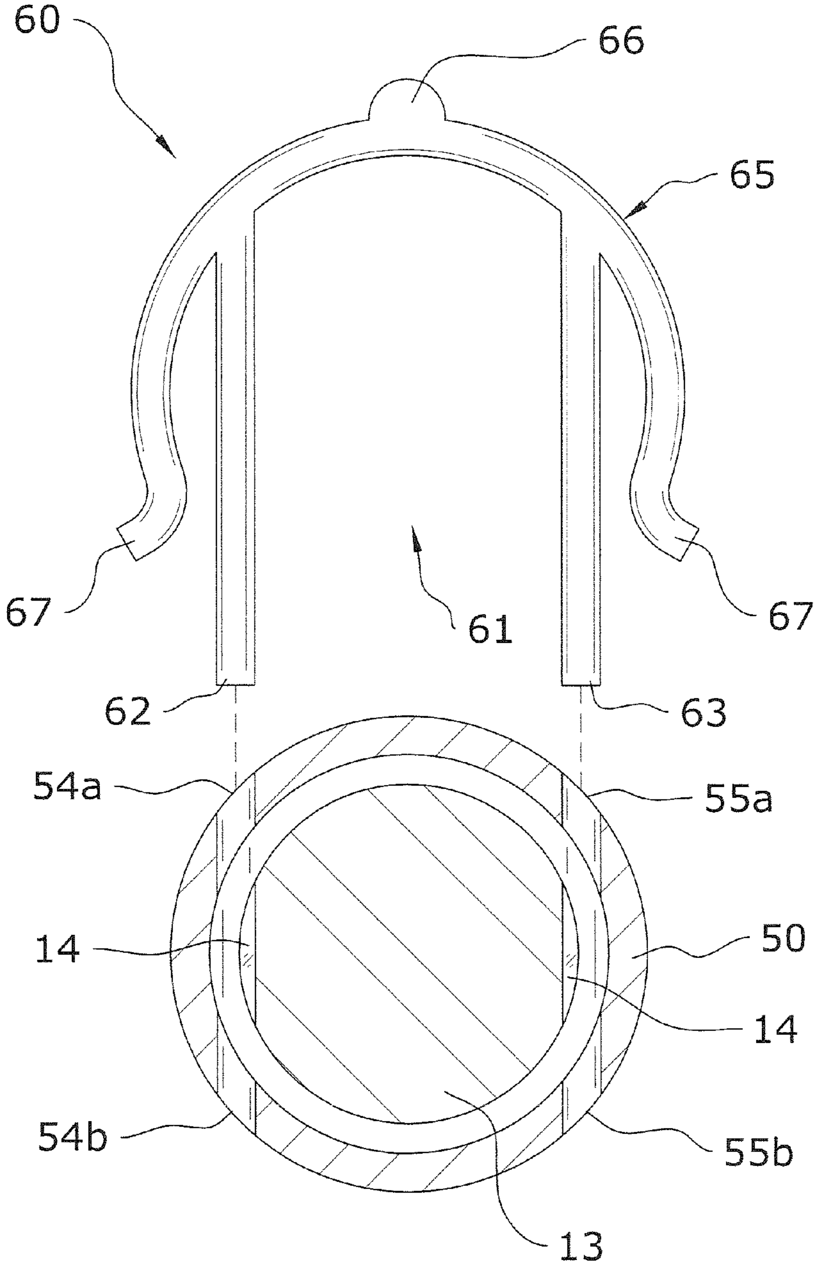
FIG. 9 is a sectional view of the receiver tube with the coupler exploded therefrom.

Turning now descriptively to the drawings, in which similar reference characters denote similar elements throughout the several views, FIGS. 1 through 9 illustrate a wheeled attachment for a litter 10, which comprises a traverse frame 20 extending across one end of the litter 12, first and second receiver tubes 50 pivotally connected to opposing ends of the frame 20, the first and second receiver tubes 50 pivoting between a first position against the frame 20 and a second position perpendicular with the frame 20 to receive the handle 13 ends of the litter 12, and including first and second wheels 40 pivotally connected to opposing ends of the frame 20 and coupled to the receiver tubes 50 to also pivot between the first and second pivotal positions parallel to and perpendicular with the frame 20. The receiver tubes 50 also include openings **54*a*, 54*b*, 55*a*, 55*b* and a coupler 60 for fixing the handles 13 within the respective coupler 60. The frame 20 further preferably extends above the netting 15 of the litter 12 to provide a foot stop for the patient upon the litter 12**.

The litter 12 generally includes elongated handles 13 being parallel and spaced apart, wherein the handles 13 extend from a first end to a second end of the litter 12 and are generally used to carry the netting 15 extending between the handles 13. The wheeled attachment 10 mounts to one end of the handles 13 of the litter 12 to allow the litter 12 to be maneuvered via only one operator at the opposing end. The wheeled attachment 10 is removable from the litter 12. The netting 15 may comprise various materials, such as cloth, webbed material, plastic, etc. all which are sufficient for supporting a patient between the handles 13.

B. Traverse Frame

The traverse frame 20 extends across the end of the litter 12 that the wheeled attachment 10 is mounted to and generally extends in front of and above the netting 15 of the litter 12 to provide a foot stop or means to prevent the patient and/or supplies from falling off of the litter 12 when the opposing end of the litter 12 is elevated to roll the wheeled attachment 10 and move the litter 12. The traverse frame 20 may be comprised of various materials, all which provide rigidity and strength to the wheeled attachment 10, such as but not limited to metal and plastic.

The traverse frame 20 is adjustable in length to accommodate for different width litters 12 and preferably telescopically adjusts via a movable first segment 21 and second segment 25. The first segment 21 and second segment 25 are comprised of linear structures, wherein the second segment 25 fits within the first segment 21 and slidably adjusts therein to alter the length of the traverse frame 20. The frictional engagement between the first segment 21 and the second segment 25, as well as the handles 13 of the litter 12 within the receiver tubes 50 ensures that the traverse frame 20 does not inadvertently adjust.

The first segment 21 generally includes a rear wall 22 extending an entire length and forming a surface facing the patient upon the litter 12 that the foot of the patient may engage. Extending forwardly from the rear wall 22 is a top wall 23*a* and a bottom wall 23*b*, each of the top wall 23*a* and the bottom wall 23*b* include a lip 24*a*, 24*b* on an outer end extending towards the opposing top wall 23*a* or bottom wall 23*b*. The second segment 25 also has a rear wall 26, top wall 27*a*, and bottom wall 27*b* to line the interior surface of the rear wall 22, top wall 23*a*, and bottom wall 23*b* of the first segment 21. The lips 24*a*, 24*b* of the first segment 21 extend on a front side of the top wall 27*a* and the bottom wall 27*b* of the second segment 25 to retain the second segment 25 within the first segment 21.

C. Pivotal Connector

The wheeled attachment 10 includes a pair of pivotal connectors 30 pivotally connected via hinges 35 on opposing ends of the traverse frame 20. The pivotal connectors 30 may be comprised of various materials, all which provide rigidity and strength to the wheeled attachment 10, such as but not limited to metal and plastic. The pivotal connectors 30 also support the wheels 40 and the receiver tubes 50 about the traverse frame 20 and allow for the collective pivoting of each end wheel 40 and receiver tube 50. Each of the pivotal connectors 30 also preferably pivots independently of the other. In addition, each of the pivotal connectors 30 are generally identical in structure and mirror each other about the traverse frame 20.

The pivotal connectors 30 each generally include a first horizontal member 31, a vertical member 32 extending downward from an end of the first horizontal member 31, and a second horizontal member 33 extending inward from the bottom end of the vertical member 32. The pivotal connectors 30 may each be comprised of an integral one-piece structure or may be comprised of a multiple-piece structure.

The first horizontal member 31 generally connects the respective wheel 40 and may form the rotational axis of the wheel 40 or be integral and concentric with the rotational axis of respective wheel 40. The vertical member 32 vertically offsets the second horizontal member 33 from the first horizontal member 31 and extends substantially below the traverse frame 20. The second horizontal member 33 supports the receiver tube 50 in a substantially horizontal position. It is appreciated that in addition to the receiver tubes 50 horizontally pivoting with the pivotal connector 30 via the hinge 35, the receiver tubes 50 may also slightly vertically pivot about the second horizontal member 33.

D. Wheels

The wheeled attachment 10 includes a pair of wheels 40 with the rotational axis of the wheels 40 concentric with the first horizontal member 31 of the pivotal connector 30 and thus substantially above the mounted end of the litter 12. The wheels 40 are also generally large in size to efficiently roll over various types of terrain, both flat and off-road. The wheels 40 may include a rubber-tired surface or various other types of tired-surfaces. The wheels 40 are able to horizontally pivot inwards and outwards via the pivotal connector 30. Each of the wheels 40 are generally identical in structure and mirror each other about the traverse frame 20. The wheels 40 generally freely rotate however various powered structures may be appreciated.

E. Receiver Tubes

The receiver tubes 50 extend in a horizontal manner from the second horizontal member 33 of the pivotal connector 30 and are able to horizontally pivot inwards and outwards via the pivotal connector 30. The receiver tubes 50 may be comprised of various materials, all which provide rigidity and strength to the wheeled attachment 10, such as but not limited to metal and plastic. Each of the receiver tubes 50 are generally identical in structure and mirror each other about the traverse frame 20.

The receiver tubes 50 are each preferably comprised of an elongated cylindrical structure having a first end connected to the second horizontal member 33 and an opposing receiver end 51 that receives the end of the handles 13 of the litter 12. The receiver end 51 is distally spaced from the end of the receiver tubes 50 connected to the pivotal connector 30 to ensure that an adequate length of the handle 13 may be inserted within the receiver tubes 50.

The receiver tubes 50 also generally each include a pair of first side openings 54*a*, 54*b* and a pair of second side openings 55*a*, 55*b* to receive a coupler 60 to fixedly secure the handles 13 within the receiver tubes 50 to prevent the handles 13 from inadvertently sliding out of the receiver tubes 50. The first side openings 54*a*, 54*b* generally extend through the top and bottom of the receiver tube 50 on a first side of the receiver tube 50 and the second side openings 55*a*, 55*b* generally extend through the top and bottom of the receiver tube 50 on a second side. The first openings 54*a*, 54*b* are generally aligned with each other and the second openings 55*a*, 55*b* are generally aligned with each other. The first openings 54*a*, 54*b* and the second openings 55*a*, 55*b* are also generally all positioned on a common plane perpendicularly intersecting the receiver tube 50.

The first openings 54*a*, 54*b* and second openings 55*a*, 55*b* are generally located adjacent the end of the receiver tube 50 connected to the pivotal connector 30; however the location of the first openings 54*a*, 54*b* and the second openings 55*a*, 55*b* may vary along the length of the receiver tubes 50. The first openings 54*a*, 54*b* and the second openings 55*a*, 55*b* may also vary in structure according to different types of fastening pins, couplers, etc. used to extend through the first openings 54*a*, 54*b* and the second openings 55*a*, 55*b* to fasten the handles 13 within the receiver tubes 50 as appreciated.

F. Couplers

The wheeled attachment 10 includes a pair of couplers 60, one for each receiver tube 50, wherein the coupler 60 extends within the first openings 54*a*, 54*b* and the second openings 55*a*, 55*b* of the receiver tube 50 to fix the inserted handle 13 within the receiver tube 50. The couplers 60 are easily inserted and removed from the receiver tubes 50 without the use of tools, etc. The couplers 60 may be comprised of various materials, all which provide rigidity and strength to the wheeled attachment 10, such as but not limited to metal and plastic.

Each of the couplers 60 generally includes an inner locking portion 61 that interconnects the receiver tube 50 to the inserted handle 13 and an outer locking portion 65 that fixes the coupler 60 to the receiver tube 50. The inner locking portion 61 and the outer locking portion 65 are generally comprised of a one-piece integral structure; however various alternate structures may be appreciated.

The inner locking structure generally includes a first member 62 and a spaced apart second member 63, each comprised of an elongated and linear structure. The first member 62 extends through both of the first openings 54*a*, 54*b* of the receiver tube 50 and the second member 63 extends through both of the second openings 55*a*, 55*b* of the receiver tube 50. The handles 13 may also include a receiver portion 14 aligned with each of the first openings 54*a*, 54*b* and the second openings 55*a*, 55*b* to ensure that the first member 62 and the second member 63 extend through the first openings 54*a*, 54*b* and the second openings 55*a*, 55*b* in a straight and smooth manner while still interconnecting the inserted handle 13.

The receiver portions 14 may be comprised of a groove within the handle 13, openings within the handle 13, a different diametric portion of the handle 13, a collar upon the handle 13, or various other structures upon the handle 13 that allow the first member 62 and the second member 63 to efficiently grab and retain the handle 13 within the receiver tubes 50 when being inserted through the first openings 54*a*, 54*b* and the second openings 55*a*, 55*b* of the receiver tube 50.

The outer locking portion 65 extends from a top end of the inner locking portion 61 and is comprised of a circular shape to substantially extend around the exterior perimeter of the receiver tube 50 to prevent the inner locking portion 61 from being removed, wherein the outer locking portion 65 tightly fits around the perimeter of the receiver tube 50. The outer locking portion 65 preferably includes a handle portion 66 extending from an upper end for easily grasping the coupler 60 to remove and insert the coupler 60. The outer locking portion 65 also preferably includes angled ends 67 that angle outwards to more easily attach the coupler 60 over the receiver tube 50.

G. Operation of Preferred Embodiment

In use, the pivotal connectors 30 are rotated outwards so that the receiver tubes 50 and the wheels 40 horizontally pivot and are perpendicular to the traverse frame 20 and the rotational axis of the wheels 40 is parallel to the traverse frame 20. The length of the traverse frame 20 is then telescopically adjusted so that the receiver tubes 50 align with the spaced-apart handles 13 of the litter 12. The ends of the handles 13 are then inserted within the receiver end 51 of the receiver tubes 50 until the receiver portion 14 of the handles 13 aligns with the first openings 54*a*, 54*b* and the second openings 55*a*, 55*b* of the receiver tubes 50.

The coupler 60 is then attached to the receiver tubes 50 to fix the handles 13 within the respective receiver tubes 50 via the first member 62 and the second member 63 of the inner locking portion 61 extending through the top openings 54*a*, 55*a*, and through the receiver portions 14 of the handles 13, and then through the bottom openings 54*b*, 55*b*. The outer locking portion 65 is simultaneously positioned around the exterior perimeter surface of the receiver tubes 50 in a tight-fitting manner thus locking the handles 13 within the receiver tubes 50 and the receiver tubs and wheels 40 perpendicular to the traverse frame 20.

When the wheeled attachment 10 is desired to be removed from the litter 12 and stowed or transported, the couplers 60 are removed from the receiver tubes 50 via pulling upward or outward upon the handle portions 66 of the couplers 60 to remove the couplers 60. The traverse frame 20 is pushed inwardly to shorten the length of the traverse frame 20 and the pivotal connectors 30 are folded inwardly so that the receiver tubes 50 and the wheels 40 horizontally pivot and are parallel to the traverse frame 20 and positioned adjacent the traverse frame 20 to provide a compact structure. In the compact, flat position, the rotational axis of the wheels 40 is generally perpendicular to the traverse frame 20.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A wheeled attachment for a stretcher, comprising:

a traverse frame having a first end and a second end;

a first receiver tube extending from said first end of said frame;

a second receiver tube extending from said second end of said frame;

wherein said first and second receiver tube are adapted to receive a first and second handle of a litter to be mounted to one end of said litter;

a first wheel pivotally connected with respect to said first end of said frame; and a second wheel pivotally connected with respect to said second end of said frame;

wherein said first and second wheel each pivot to a first position and a second position, wherein a rotational axis of said first and second wheel is perpendicular to said traverse frame in said first position so that said first and second wheel are positioned parallel to said traverse frame and wherein said rotational axis of said first and second wheel is parallel to said traverse frame in said second position so that said first and second wheel are positioned perpendicular to said traverse frame;

wherein said first and second receiver tubes each include at least one coupling opening to receive a coupler;

wherein said at least one coupling opening of said first and second receiver tubes each comprises:

a pair of first openings having a first upper opening and a first lower opening;

said first upper opening and said first lower opening located on an upper and lower end of a first side of said first and second receiver tubes; and a pair of second openings having a second upper opening and a second lower opening;

said second upper opening and said second lower opening located on an upper and lower end of a second side of said first and second receiver tubes.

2. The wheeled attachment of claim 1, wherein said first and second receiver tube are each pivotally connected with respect to said traverse frame.

3. The wheeled attachment of claim 1, wherein each said coupler comprises:

an inner locking portion comprising a first member extending through said pair of first openings and a second member extending through said pair of second openings; and an outer locking portion connected to said inner locking portion and comprised of a circular shape, said outer locking portion extending substantially around a perimeter of said respective receiver tube.

4. The wheeled attachment of claim 3, wherein said outer locking portion includes a handle.

5. The wheeled attachment of claim 3, wherein said outer locking portion includes angled ends.

6. The wheeled attachment of claim 1, wherein said first receiver tube pivots with said first wheel and wherein said second receiver tube pivots with said second wheel.

7. The wheeled attachment of claim 1, wherein said traverse frame includes a first segment and a second segment, wherein said first segment adjusts along said second segment.

8. The wheeled attachment of claim 7, wherein said first segment and said second segment telescopically adjust.

9. A wheeled attachment for a stretcher, comprising:

a litter having a first end and a second end;

said litter having a first elongated handle, a second elongated handle spaced apart from and parallel to said first elongated handle, said first and second elongated handle extend from said first end of said litter to said second end of said litter;

wherein said litter includes a netting extending between said first and second elongated handle;

a traverse frame having a first end and a second end, said frame extending across said first end of said litter;

a first receiver tube pivotally connected with respect to first end of said frame;

a second receiver tube pivotally connected with respect to said second end of said frame;

wherein said first and second receiver tube are adapted to receive said first and second elongated handles of said litter to be mounted to said first end of said litter;

a first wheel pivotally connected with respect to said first end of said frame; and a second wheel pivotally connected with respect to said second end of said frame;

wherein said first and second wheel each pivot to a first position and a second position, wherein a rotational axis of said first and second wheel is perpendicular to said traverse frame in said first position so that said first and second wheel are positioned parallel to said traverse frame and wherein said rotational axis of said first and second wheel is parallel to said traverse frame in said second position so that said first and second wheel are positioned perpendicular to said traverse frame.

10. The wheeled attachment of claim 9, wherein said first and second receiver tube slidably receive by said first and second elongated handle.

11. The wheeled attachment of claim 9, including:

a first coupler to secure said first receiver tube to said first elongated handle; and a second coupler to secure said second receiver tube to said second elongated handle.

12. The wheeled attachment of claim 11, including:

at least one first opening extending through said first receiver tube;

a first receiver portion extending within said first elongated handle, said first receiver portion aligned with said at least one first opening;

wherein said first coupler extends through said at least one first opening and at least partially within said first receiver portion to secure said first elongated handle within said first receiver tube;

at least one second opening extending through said second receiver tube; and a second receiver portion extending within said second elongated handle, said second portion aligned with said at least one second opening;

wherein said second coupler extends through said at least one second opening and at least partially within said second receiver portion to secure said second elongated handle within said second receiver tube.

13. The wheeled attachment of claim 12, wherein said at least one first opening includes a pair of first upper openings and a pair of first lower openings, said first upper openings aligning with said first lower openings, and wherein said at least one second opening includes a pair of second upper openings and a pair of second lower openings, said second upper openings aligning with said second lower openings.

14. The wheeled attachment of claim 13, wherein said first coupler comprises a first inner locking extending through said first upper openings and said first lower openings and a first outer locking portion extending from an end of said first inner locking portion, said first outer locking portion extending around a substantial perimeter of said first receiver tube, and wherein said second coupler comprises a second inner locking extending through said second upper openings and said second lower openings and a second outer locking portion extending from an end of said second inner locking portion, said second outer locking portion extending around a substantial perimeter of said second receiver tube.

15. The wheeled attachment of claim 9, wherein said first receiver tube collectively pivots with said first wheel and wherein said second receiver tube collectively pivots with said second wheel.

16. The wheeled attachment of claim 9, wherein said frame telescopically adjusts.

17. The wheeled attachment of claim 9, wherein said traverse frame is positioned above said netting of said litter.

18. A wheeled attachment for a stretcher, comprising:

a litter having a first end and a second end;

said litter having a first elongated handle, a second elongated handle spaced apart from and parallel to said first elongated handle, said first and second elongated handle extend from said first end of said litter to said second end of said litter;

wherein said litter includes a netting extending between said first and second elongated handle;

a traverse frame having a first segment and a second segment, said second segment slidably adjustable within said first segment to adjust a length of said traverse frame;

a first pivotal connector pivotally connected to a first end of said frame;

a second pivotal connector pivotally connected to a second end of said frame;

a first receiver tube horizontally extending from a lower end of said first pivotal connector;

a second receiver tube horizontally extending from a lower end of said second pivotal connector;

wherein said first and second receiver tube are adapted to receive said first and second elongated handles of said litter to be mounted to said first end of said litter;

a first wheel rotationally connected to an upper end of said first pivotal connector, said rotational axis of said first wheel vertically offset from said first receiver tube;

a second wheel rotationally connected to an upper end of said second pivotal connector, said rotational axis of said second wheel vertically offset from said second receiver tube;

wherein said first and second wheel along with said first and second receiver tube each pivot to a first position and a second position via said first and second pivotal connector, wherein said first and second wheel and said first and second receiver tube are parallel to said traverse frame in said first position and wherein said first and second wheel and said first and second receiver tube are perpendicular to said traverse frame in said second position;

a first coupler to secure said first receiver tube to said first elongated handle;

a second coupler to secure said second receiver tube to said second elongated handle;

at least one first opening extending through said first receiver tube;

a first receiver portion extending within said first elongated handle, said first receiver portion aligned with said at least one first opening;

wherein said first coupler extends through said at least one first opening and at least partially within said first receiver portion to secure said first elongated handle within said first receiver tube;

at least one second opening extending through said second receiver tube; and a second receiver portion extending within said second elongated handle, said second portion aligned with said at least one second opening;

wherein said second coupler extends through said at least one second opening and at least partially within said second receiver portion to secure said second elongated handle within said second receiver tube;

wherein said at least one first opening includes a pair of first upper openings and a pair of first lower openings, said first upper openings aligning with said first lower openings, and wherein said at least one second opening includes a pair of second upper openings and a pair of second lower openings, said second upper openings aligning with said second lower openings;

wherein said first coupler comprises a first inner locking extending through said first upper openings and said first lower openings and a first outer locking portion extending from an end of said first inner locking portion, said first outer locking portion extending around a substantial perimeter of said first receiver tube, and wherein said second coupler comprises a second inner locking extending through said second upper openings and said second lower openings and a second outer locking portion extending from an end of said second inner locking portion, said second outer locking portion extending around a substantial perimeter of said second receiver tube;

wherein said traverse frame is positioned above said netting of said litter.

* * * * *